United States Patent [19]

Reynal

[11] Patent Number: 4,827,150
[45] Date of Patent: May 2, 1989

[54] UNINTERRUPTIBLE POWER SUPPLY INVERTER CIRCUIT

[76] Inventor: Thomas J. Reynal, 1127 Ivy Wall, Houston, Tex. 77079

[21] Appl. No.: 204,095

[22] Filed: Jun. 8, 1988

[51] Int. Cl.[4] .................. H02J 7/00; H02M 7/538
[52] U.S. Cl. ........................... 307/66; 363/56; 363/97; 363/134
[58] Field of Search ............ 363/56, 97, 134; 307/66

[56] References Cited

U.S. PATENT DOCUMENTS

| | | | |
|---|---|---|---|
| 3,733,537 | 5/1973 | Kernick et al. | 363/56 |
| 3,859,586 | 1/1975 | Wadlington | 363/56 |
| 4,155,113 | 5/1979 | Simmons | 363/56 |
| 4,336,587 | 6/1982 | Boettcher, Jr. et al. | 363/134 |
| 4,456,950 | 6/1984 | Cordy | 363/56 |
| 4,489,371 | 12/1984 | Kernick | 363/41 |
| 4,553,039 | 11/1985 | Stifter | 307/66 |
| 4,692,854 | 9/1987 | Baxter et al. | 363/41 |
| 4,706,180 | 11/1987 | Wills | 363/132 |

Primary Examiner—William H. Beha, Jr.
Attorney, Agent, or Firm—Pravel, Gambrell, Hewitt, Kimball & Krieger

[57] ABSTRACT

An inverter is provided, especially for use in an uninterruptible power supply, with its switching transistors being ground referenced and its output voltage fed back and compared to a single reference waveform for a self-setting duty cycle control of the switching transistors. The switching transistors are activated only when the output voltage is outside of a predetermined error band from the desired level, with the control system activating the switching transistors to drive the output voltage to the desired level and deactivating the switching transistors when the output voltage is within the error band. A current limit circuit provides current limit control which varies depending on the angle and magnitude of the output voltage.

32 Claims, 5 Drawing Sheets

SIN/2

IS NODE 341

UNINTERRUPTIBLE POWER SUPPLY INVERTER CIRCUIT

BACKGROUND OF THE INVENTION

1. Field of the Invention

The present invention relates to inverter circuits, especially to inverter circuits used in uninterruptible power supplies.

2. Description of the Prior Art

The need for high quality, reliable, inexpensive uninterruptible power supplies is becoming much more critical as the use of computer systems and other relatively sensitive electronic equipment increases. Uninterruptible power supplies are used to provide continuous alternating current power to the attached equipment so that potentialy catastrophic failures do not result should the general alternating current power supply be removed or should the genera alternating current power supply contain undesirable transients. Uninterruptibe power supplies generally include rectifier circuits, a battery, a battery voltage booster circuit and an inverter circuit. The inverter circuit is used to provide an alternating current output voltage acceptable for use by the attached equipment from a direct current input voltage.

The outputs of most uninterruptible power supplies are either square wave or sine wave voltages. However, because most electronic systems are designed to operate on the specific root mean square and peak value input waveforms found in sine wave sources, the square wave output supplies do not power the systems in a predictable fashion and are therefore not sufficiently reliable without extended testing. Thus, sine wave outputs are preferable for production by uninterruptible power supplies.

Inverters are the circuits which produce an alternating current waveform from a direct current voltage source. Typically, inverters used transistors to control the voltage and current to a series of inductors and capacitors to develop the alternating current supplied to the load. A reference waveform was sometimes developed for transistor control purposes.

There were a number of common circuit designs used to form inverters. One common circuit used in an inverter used four transistors in a bridge configuration and a monopolar direct current voltage supply. The direct current voltage source was connected to two opposite corners of the bridge, while the load was connected in series with switching inductors between the other two corners of the bridge. Switching capacitors were generally connected from the load terminals to the direct current ground voltage. A pulse width modulated drive signal was supplied lo the transistors to control the conduction of opposinq transistors in the bridge and an alternating current was developed by alternatingly changing the conduction of the transistor pairs. This circuit design had the general disadvantage that only one transistor in each pair could be driven by a ground referenced control signal, while the other transistor had to be driven by a control signal which was referenced from the direct current positive voltage. This control signal referenced from the positive supply was difficult to develop and complicated the inverter circuits of this class.

A second common inverter circuit used to create a sine wave output required a bipolar direct current voltage source. In that design only two transistors were needed, each transistor coupled to one of the direct current voltages and the two transistor outputs coupled to each other. From this common point a switching inductor and the load were connected in series to the ground voltage, with a switching capacitor connected from the load and inductor junction to the ground voltage. The transistors were alternately activated so that the switching inductor was alternately coupled to the positive and negative direct current voltages to develop an alternating current waveform at the load. The circuit had the disadvantage that it required the use of or development of bipolar direct current voltages, with the additional capacitors and diodes needed over a monopolar direct current system and resulted in increased complexity in battery boost voltage circuitry when used in an uninterruptible power supply application.

It is desirable to have a circuit which allows transistors which are controlled by a ground referenced siqnal for ease in developing the transistor control signal and which allows the use of a monopolar direct current voltage source. Additionally, it is desirable that the circuit operate at its own duty cycle of transistor switching operation and activate a transistor only when the output voltage waveform is outside desired limits.

U.S. Pat. No. 4,553,039 disclosed an uninterruptible power supply utilizinq a center tapped transformer with inductors and capacitors as energy storage devices. This patent disclosed a two transistor switch design with both transistor switches ground referenced. Additionally, this patent disclosed the use of voltage feedback from the primary or input winding of an output transformer and a circuit which had a self-determined duty cycle. The output waveform reference used in the circuit disclosed in the patent was developed by the use of two separate reference waveforms, one for the upper half cycle of the desired sine wave output and one for the lower half cycle of the desired sine wave output. The upper half cycle reference waveform was coupled to one comparator circuit while the lower half was coupled to a second comparator circuit, with one transistor switch controlled by each comparator. The comparators were configured so that if the voltage was respectively too far below the upper half cycle reference or too far above the lower half cycle reference, the appropriate transistor switch was energized to increase the magnitude of the output voltage. This drive system worked in some situations, but the circuit would not provide a proper output waveform should the magnitude of the voltage be too great, for example, more positive than the positive reference waveform or more negative than the negative reference waveform. The design disclosed would not bring the output voltage back to within a desired tolerance range. Additionally, if the two reference waveforms were not identical a non-uniform output waveform developed, with resulting problems.

U.S. Pat. No. 4,489,371 disclosed a four active device bridge circuit utilizing a self-determining duty cycle feedback control circuit. The output voltage of a transformer was fed back and used by a comparator which had a desired reference voltage. The comparator circuitry was designed so that one or the other of the active device pairs used in the design were activated at all times. Because one of the active device pairs was activated at all times the voltage output was always hunting or oscillating about the desired reference.

SUMMARY OF THE INVENTION

The present invention includes an inverter circuit for an uninterruptible power supply. The inverter utilizes ground referenced switching transistors and has a transistor drive control circuit designed so that when the output waveform is more than a given amount away from a reference waveform, the output voltage is driven toward the desired waveform by the appropriate transistor, but while the output waveform is within given limits or tolerances from the reference waveform, the output transistors are disabled.

A rectifier network is connected to an incoming alternating current voltage source to provide a direct current voltage source for the uninterruptible power supply. Also connected to the incoming voltage source is a battery charger which is used to keep a battery contained in the power supply charged should the alternating current voltage source be removed. Connected between the battery and the positive voltage output of the direct current voltage source is a boost converter used to boost the battery voltage to a level approximately equal to that supplied by the rectifier network when the alternating current voltage source is supplied. This positive voltage output is additionally connected to a center tap on the primary or input winding of an output transformer. Connected to the two end terminals of the input winding of the output transformer is an energy storage means which includes a dual winding reactor and two capacitors. The capacitors are coupled between the output transformer input terminals and the direct current voltage source, while the reactor windings are coupled between the input terminals to the output transformer and the switching transistors. The inverter switching transistors are coupled to he direct current voltage source ground output through a current sensing resistor.

The voltage being coupled to the input terminals of the output transformer is provided to a feedback amplifier which appropriately shifts and divides the voltage for use in the remaining portions of the drive circuitry. This shifted and divided signal is used in combination with the output voltage from a sine wave reference supply to produce an error voltage. If the error voltage is more positive than a desired amount, indicting that the output voltage is too low, for example, a first comparator determines this out of range condition and activates a switching transistor to increase the output voltage. When the output voltage is within a given amount from the reference source, as indicated by the error voltage being reduced, the switching transistor is disabled and voltage monitoring continues. If the error voltage is below a given level, indicating that the output voltage is too positive, then a second comparator senses this condition and activates the other switching transistor, so that the output voltage is driven in a negative direction, until the error signal is within a given amount of the zero error level. When the error signal is within this given deadband, drive to the second transistor is discontinued and monitoring of the output voltage is continued. Because of the continuous monitoring of the output voltage, the control circuitry develops its own duty cycle of operation as needed based upon the error signal condition.

An additional comparator is provided to analyze the voltage developed across the current sensing resistor connected between the switching transistors and the ground voltage output. Should the voltage across the current sensing resistor reach too high a level, indicating that the instantaneous current being supplied by the drive transistor is exceeding desired levels, the comparator disables the drive circuitry to the transistors at least for a predetermined minimum time and after that time until the current levels come within certain allowable levels.

Therefore it can be seen that the inverter circuit of the present invention utilizes ground referenced switching transistors and output voltage feedback with a control circuit setting its own operation duty cycle and having a deadband so that the output voltage stays within a certain error margin of the desired reference level regardless of whether the attached device presents an inductive, resistive or capacitive load.

DETAILED DESCRIPTION OF THE PREFERRED EMBODIMENTS

Figure 1:
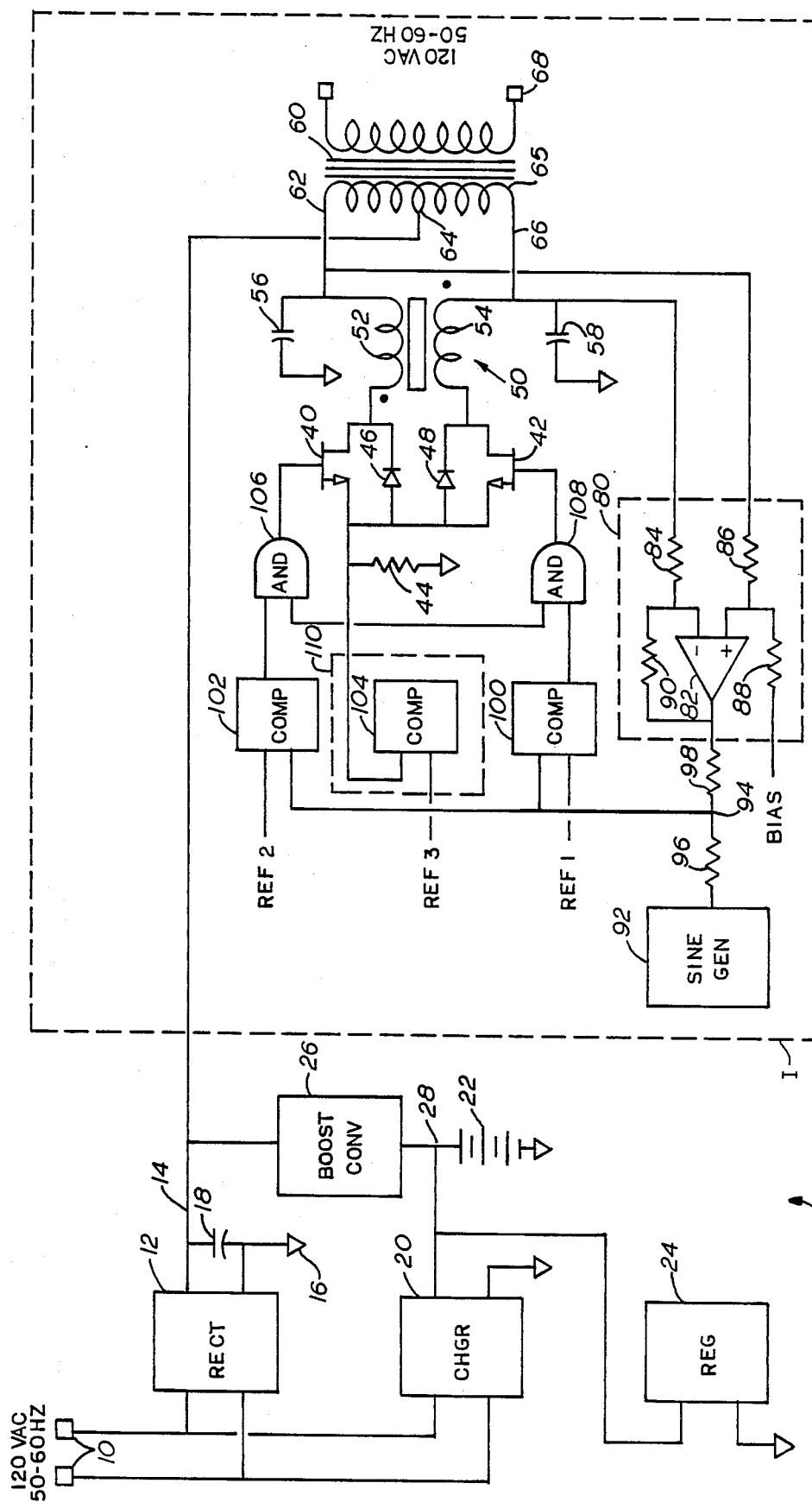
FIG. 1 is a schematic electrical circuit diagram of an uninterruptible power supply according to the present invention.

Referring now to FIG. 1, the letter U generally represents an uninterruptible power supply according to the present invention. The power supply U is connected to an alternating current voltage source 10. The alternating current voltage source 10 is used to supply energy to the power supply U and is used to charge a battery 22. Under normal operating conditions the alternating current voltage source 10 is supplying the energy used to operate the power supply U, but when the alternating current voltage source 10 is not present, the battery 22 supplies the energy. The alternating current voltage source 10 is connected to a rectifier 12 to produce a positive voltage output 14 and a ground voltage output 16. Generally associated with the rectifier 12 is a capacitor 18 to help filter the rectified waveform to produce a more uniform direct current voltage.

Also connected to the alternating current voltage source 10 is a battery charger 20. The battery charger 20 is used to keep the battery 22 charged so that should operation from the energy contained in the battery 22 be necessary, the battery 22 will always be as charged as possible so that the attached device can operate as long as feasible. The battery 22 has a negative terminal connected to the ground voltage output 16 and has a positive voltage terminal connected to a junction point 28. The voltage present at junction point 28 is provided to a regulator 24 to produce a highly regulated operating voltage for the electronic control components located in the power supply U. Also connected to the junction point 28 is a boost converter 26. The boost converter 26 boosts the battery voltage, preferably 36 volts, to the 130 to 170 volts preferable at the positive voltage output 14 for a 120 volt alternating current voltage source nominal level. The positive voltage output 14 is supplied to the center tap 64 of a primary or input winding 65 of an output transformer 60. The input winding 65 has two terminals 62 and 66 and is inductively coupled to an output winding 68. The turns ratio of the transformer 60 is such that the desired alternating current voltage level of output power appears on the output winding 68.

An inverter I is coupled to the positive and ground voltage outputs 14, 16 to produce an alternating current voltage on the transformer output winding 68. The main switching elements utilized in the inverter I of FIG. 1 are two switching transistors 40 and 42, preferably field effect transistors to enable them to be switched at high frequencies with relatively low control currents and to allow increased inverter efficiency because of low internal resistance and low energy drive requirements. The switching transistors 40 and 42 have their sources connected to the ground voltage output 16 by means of a current sensing resistor 44. The drains of the switching transistors 40 and 42 are coupled to an energy storage reactor 50. The reactor 50 is preferably a dual winding saturable reactor having two windings 52 and 54. Each winding 52 and 54 has one terminal coupled to the drain of a switching transistor 40 and 42 with the second terminal of each winding 52 and 54 coupled to one of the two input terminals 62 and 66 of the output transformer 60. The two windings 52 and 54 of the energy storage reactor 50 are configured so that additive fluxes are developed by a current entering one winding from a switching transistor 40 and by a current entering the alternate winding from the output transformer 60, as shown by the dots on the energy storage reactor 50. The energy storage reactor 50 is preferably saturable so that when high current levels are supplied by the reactor 50 during the peaks of the output waveform, the reactor 50 approaches saturation and thereby lowers its effective inductance value, resulting in an automatic tuning of the energy storage reactor 50 to maintain a high frequency of operation throughout each half cycle of the output waveform Connected between the reactor windings 52 and 54 and the current sensing resistor 44 are two diodes 46 and 48, one for each switching transistor 40 and 42. Each of the diodes 46 and 48 is connected such that its anode is connected to the current sensing resistor 44. The diodes 46 and 48 are then in parallel with the output of the switching transistors 40 and 42 and thus are freewheeling diodes. These freewheeling diodes 46 and 48 may be the inherent diodes contained on the switching transistors 40 and 42 or may be external diodes where no inherent diode exists in the switching transistors 40 and 42 or if the recovery time of the inherent diodes is greater than desired.

A freewheeling diode 48 conducts when the voltage across the energy storage reactor 50 reverses during the deactivated time of the switching transistor 40 to support the magnetic flux in the energy storage reactor 50 by allowing current to flow through the opposite winding of the energy storage reactor 50. The other freewheeling diode 46 is the complement to the first diode 48 for use with the other switching transistor 42 and the energy storage reactor 50.

Also coupled to the input terminals 62 and 66 of the output transformer 60 are two energy storage capacitors 56 and 58. The capacitors 56 and 58 are connected to the ground voltage output 16 in the embodiment of FIG. 1 and work in cooperation with the energy storage reactor 50 to form the primary energy storage for use in the inverter 1.

The voltage appearing across the input winding 65 of output transformer 60 is fed back to a feedback amplifier circuit 80. An illustrative waveform 406 of the voltage appearing across the input winding 65 of the output transformer 60 is shown in solid lines in FIG. 4. A feedback operational amplifier 82 configured in a differencing arrangement is the active portion of the feedback amplifier 80, with the signals from the output transformer 60 being buffered by resistors 84 and 86 to prevent damage to the feedback operational amplifier 82. One resistor 84 is connected to the inverting terminal of &he feedback operational amplifier 82, while the other resistor 86 is connected to the non-inverting terminal of the feedback operational amplifier 82. A bias voltage is applied to the non-inverting terminal of the feedback operational amplifier 82 by means of a bias resistor 88 connected to a bias voltage so that the feedback operational amplifier 82 produces an output waveform oscillating about this bias point because the voltage between the output transformer input terminals 62 and 66 is an alternating current waveform. This bias shift is necessary because the control componentary preferably operates on a unipolar direct current voltage, so that any signals cannot swing from an absolute positive to a negative voltage, but instead must vary around a positive bias level. A feedback gain resistor 90 is connected between the inverting terminal and the output of the feedback operational amplifier 82 to provide the desired gain for the feedback operational amplifier 80.

Figure 4:
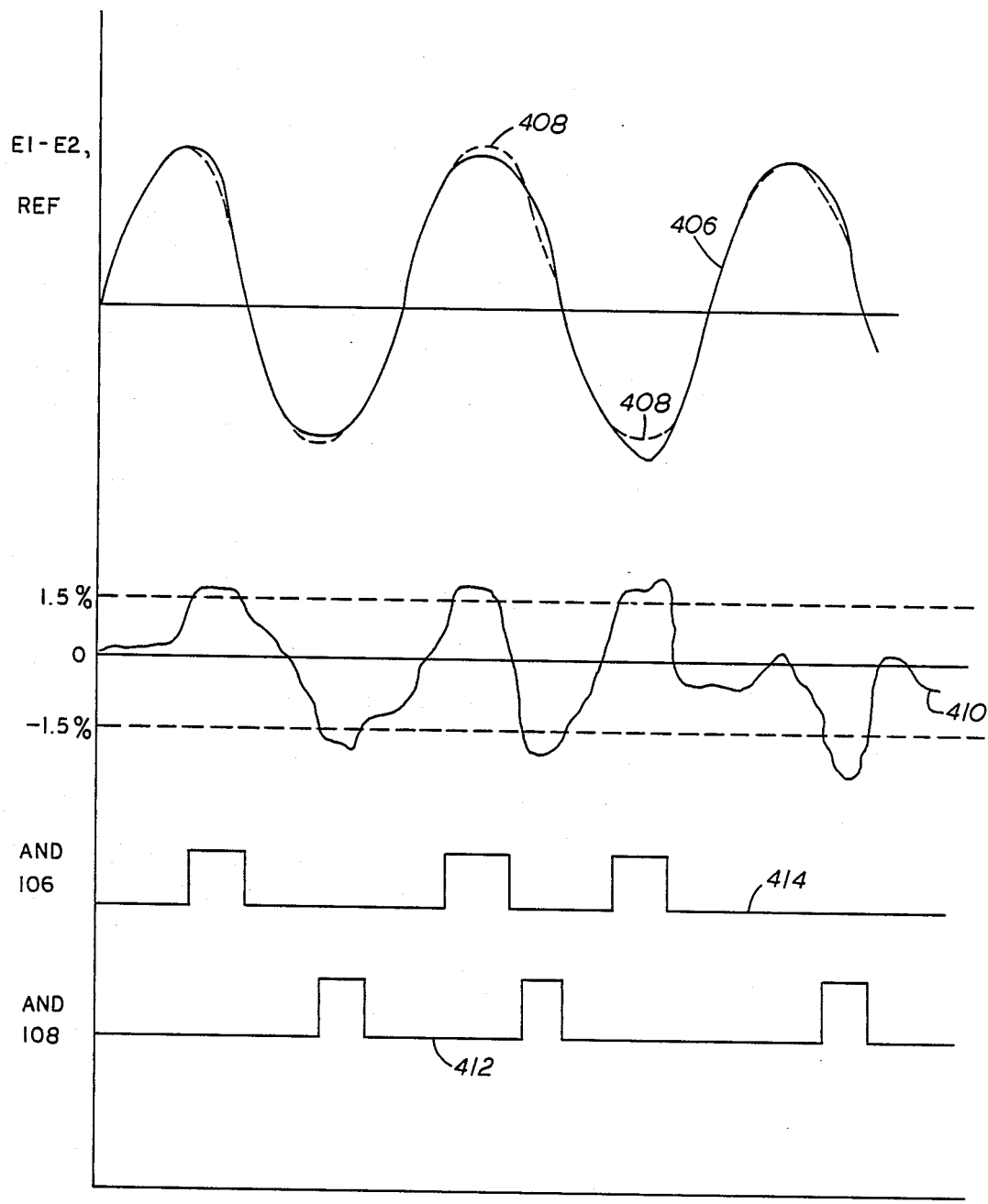
FIG. 4 is a diagram illustrating various waveforms in an uninterruptible power supply according to the present invention.

A sine wave reference generator 92 is used in the inverter I to develop the desired reference waveform within given tolerances and at a different voltage level at the output transformer output winding 68. The output of this sine wave reference generator 92, which is a signal containing an alternating current component and a direct current component, is coupled to a voltage divider point 94 through a resistor 96. The output of the feedback amplifier 80 is coupled to the voltage divider point 94 by means of a resistor 98. The reference sine wave and the output sine wave are 180 degrees out of phase with each other. An illustrative reference voltage waveform 408 which is in phase with the output waveform 406 is shown in dotted lines in FIG. 4 for ease of reference. The voltage appearing at the voltage divider point 94 is an error voltage indicating the magnitude and direction of any error of the output voltage waveform as measured at the input winding 65 of the output transformer 60 with respect to the desired sine wave reference. An exemplary error voltage waveform 410 is shown in FIG. 4, with dotted lines indicating the preferable error band. The error voltage is developed by the voltage division of the feedback operational amplifier 82 waveform and the reference waveform performed by the connecting resistors 96 and 98, which preferably are of equal value so a simple arithmatic sum divided by two can be used for calculation purposes. For example, if the feedback operational amplifier 82 output is 12 volts and the reference waveform voltage is 11.75 volts, the voltage present at the voltage divider point 94 is 11.875 volts, a condition preferably set as the zero error voltage level. This error voltage is applied to the inputs of a series of two comparators 100, 102. The two comparators 100, 102 are used to determine if the error voltage is such that it is necessary to enable one of the switching transistors 40 and 42. A third comparator 104 is utilized in a current limit block 110 which determines if the switching transistors 40 and 42 are in an overcurrent mode, and if so, disables the drive to both switching transistors 40 and 42.

The first comparator 100 is connected to a first reference voltage REF1. Preferably the first reference voltage REF1 is a voltage in relation to the error signal which is slightly below the zero error level. The first comparator 100 activates the switching transistor 42 by way of an output control AND gate 108 if the error voltage is below the first reference voltage REF1 as shown in the exemplary output waveform 412 of the AND gate 108. By activating the switching transistor 42, the voltage appearing across the input winding 65 of the output transformer 60 changes in a negative direction. This changing voltage reduces the error voltage, until the error voltage is of a magnitude less than the first reference voltage REF1 from the zero error level.

The second comparator 102 is provided with a second reference voltage REF2 which is a reference voltage slightly in excess of the desired zero error level. When the comparator 102 determines that an error signal voltage in excess of REF2 is present, the comparator 102 acts through an output control AND gate 106 to activate the switching transistor 40 as shown, for example, by waveform 414, so that the voltage appearing on the input winding 65 of the output transformer 60 is driven in a positive direction, thereby reducing the error signal. The voltage appearing across the input winding 65 increases because a current flows through the energy storage reactor 50 to reduce the voltage on the other energy storage capacitor 56. This reduced voltage on the energy storage capacitor 56 results in an increase in the current in and the voltage across the input winding portion from the center tap 64 to the positive input terminal 62 and a resulting positive change in he input winding overall voltage. The energy stored in the components is then utilized and reduces until the error voltage exceeds the desired limits and a comparator 100, 102 is triggered.

In this manner, the inverter I drives the output switching transistors 40 and 42 so that a voltage appears on the output transformer 60 which is in a certain band or tolerance level from the reference waveform. If the error signal voltage exceeds a certain limit greater than the allowable error signal voltage, the switching transistor 40 is activated to drive the output voltage up to the desired level. If the error signal voltage is below a given level below the desired level, then the other switching transistor, transistor 42, is activated to drive the output voltage in a negative direction until it is within the desired limits. If the output voltage is within the desired band around the zero error level, neither switching transistor 40 and 42 is driven and the circuit continues operation from the energy stored in the energy storage reactor 50 and the energy storage capacitors 56 and 58 until a comparator 100 or 102 senses an out of tolerance condition and activates a switching transistor as described above.

A third reference voltage REF3 is applied to a third comparator 104. The third comparator 104 receives as its measured signal the voltage appearing across the current sensing resistor 44. Should the voltage on the current sensing resistor 44 exceed the desired voltage as characterized by the third reference voltage REF3, the third comparator 104 disables the two output control AND gates 106 and 108 utilized in driving the switching transistors 40 and 42 and thereby stops all production of drive current by the switching transistors 40 and 42 for a period of time to allow the stored energy to diminish.

As can been seen, the inverter 1 circuit operates in a self-setting duty cycle mode depending upon the error condition of the desired output voltage. The basic maximum frequency of operation is determined by the values of the energy storage reactor 50 and the energy storage capacitors 56, 58, with the switching frequency preferably about 120 times the basic output frequency.

Figure 2A:
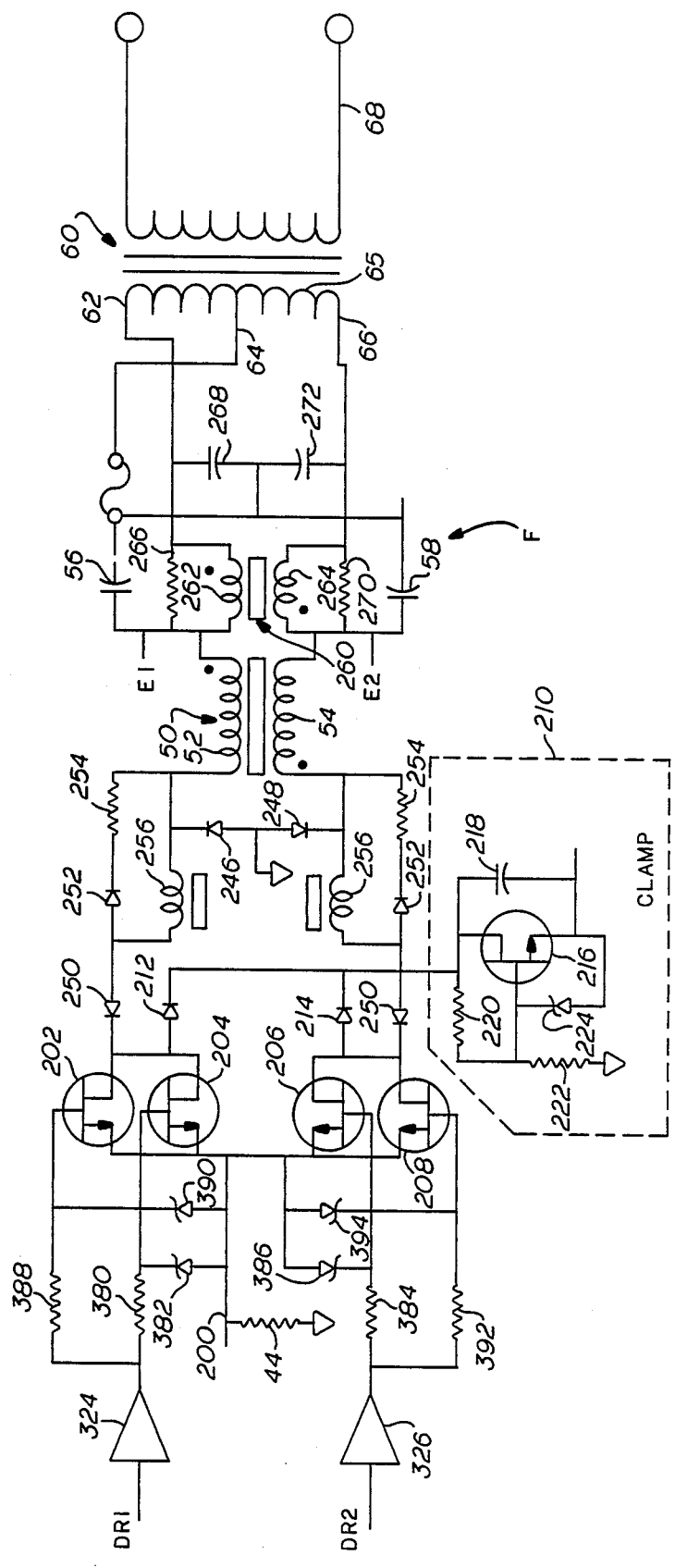
FIGS. 2A and 2B are detailed electrical circuit diagrams of inverter output and control circuitry for use in an uninterruptibe power supply according to the present invention.
Figure 2B:
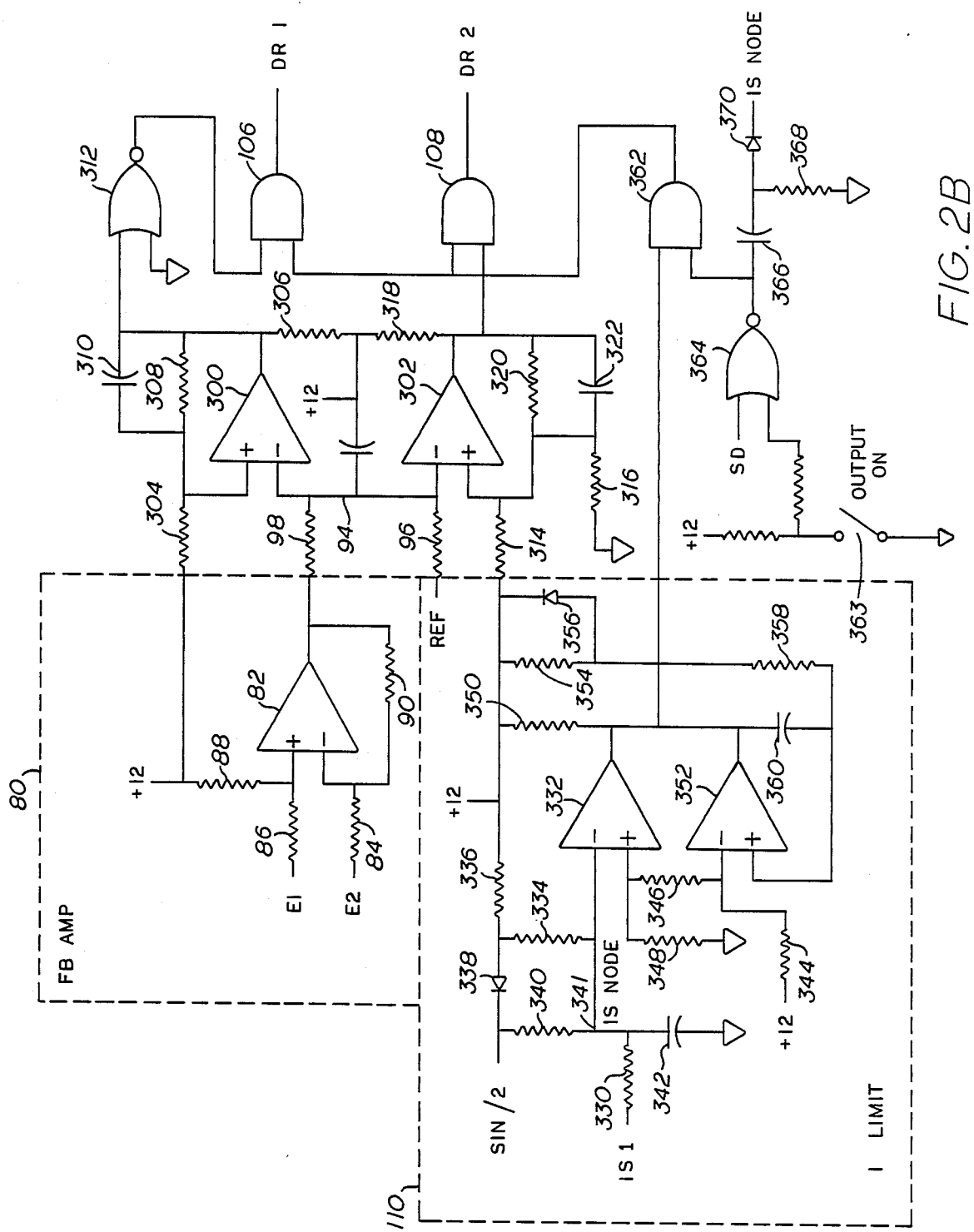

Referring now to FIGS. 2A and 2B, which are more detailed schematic circuit diagrams illustrating portions of the inverter I (FIG. 1), it is to be noted that the switching transistors 40 and 42 can be formed of parallel transistors, so that transistors 202 and 204 (FIG. 2A) are equivalent to transistor 40 and transistors 206 and 208 are equivalent to transistor 42. This use of parallel transistors is preferable in a higher current environment to provide proper load sharing and provide more current and power capability.

The drains of the switching transistors 202-208 are connected to an overvoltage clamp 210 to prevent the development of a voltage in excess of desirable limits on the switching transistors 202-208 and thereby increase the reliability of the inverter I and the power supply U. Any excess voltage occurring at the drains of the switching transistors 202-208 is bled off to the positive voltage output 14 by the overvoltage clamp 210. An overvoltage diode 212 has its anode connected to the drains of one pair of switching transistors 202 and 204 and its cathode connected to the drain of a clamp transistor 216. A second overvoltage diode 214 has its anode connected to the drains of the other pair of switching transistors 206 and 208 and its cathode connected to the drain of the clamp transistor 216. The clamp transistor 216 is enabled to couple the overvoltage diodes 212 and 214 to the positive voltage output 14 when the voltage appearing at its drain exceeds a desired level. A pair of resistors 220 and 222 connected in series are connected between the drain of the clamp transistor 216 and the ground voltage output 16, with the connection point between the two resistors 220 and 222 being connected to the gate of the clamp transistor 216. In this manner, as the voltage increases on the drain, the clamp transistor 216 turns on, thereby coupling the overvoltage to the direct current voltage source because the source of the clamp transistor 216 is connected to the positive voltage output 14. The voltage applied to the gate of the clamp transistor 216 with respect to the source of the clamp transistor 216 is limited by the use of a zener diode 224 having its cathode connected to the gate and its anode connected to the source and to the positive voltage output 14. Additionally, a capacitor 218 is connected from the drain to the source of the clamp transistor 216.

Additional circuit components are provided in this embodiment of the present invention between the drain of the switching transistors and the energy storage reactor 50. This additional circuitry is used to reduce the rate of current change appearing at the switching transistors because of the capacitance of the energy storage reactor 50 and the reverse diodes 246 and 248 and is also especially useful at higher power levels. Because the rate of current change circuitry is of like construction in each leg, any one leg of the circuitry will be described in detail, like reference numerals in each leg of the rate of current change circuitry leg identifying like components. A diode 250 has its cathode connected to the drain of the switching transistors 202 and 204 and its anode connected to a diode 252 and one terminal of a highly saturable inductor 256. The cathode of the second diode 252 is connected to one terminal of a resistor 254 which has its other terminal connected to the second terminal of the inductor 256. The second terminal of the resistor 254 and the inductor 256 are both connected to one winding 52 of the energy storage reactor 50. Preferably the values of the resistor 254 and inductor 256 are chosen so that only very high frequency components are limited, the duration of the filtering being set at approximately 200 nanoseconds in the preferred embodiment.

In the embodiment of FIGS. 2A and 2B, a freewheeling diode 246 equivalent to freewheeling diode 46 has its cathode connected to the common point of resistor 254, inductor 256 and winding 52 and has its anode connected to the ground voltage output 16. Similarly, a second freewheeling diode 248 equivalent to freewheeling diode 48 has its cathode connected to the secondary winding 54 and its anode connected to the ground voltage output 16.

Additional filtering is sometimes desirable in the energy storage reactor 50, such as when higher power levels are being developed by the inverter I and when the load that is being driven is capacitive. The energy storage reactor 50 is not directly connected o the output tranformer 60 (FIG. 2A) but is coupled to the output transformer 60 through alternative filtering circuitry F. A dual winding filtering reactor 260 is used to help filter the output signal. The filtering reactor 260 has two windings 262, 264. The first winding 262 has two terminals and is connected in parallel with a resistor 266. The first winding 262 is also connected to one winding 52 of the main reactor 50 and has its other terminal connected to the input winding terminal 62 of the output transformer 60. A filtering capacitor 268 is connected between the input winding terminal 62 and the positive voltage output 14. The second winding 264 of the filtering reactor 260 has two terminals connected to a resistor 270 to form a parallel circuit. The second winding 264 is connected to the second winding 54 of the energy storage reactor 50 and to the second input terminal 66 of the output transformer 60. A filtering capacitor 272 is provided for this portion of the circuitry and is connected between the input winding terminal 66 and the positive voltage terminal 14. The windings 262 and 264 of the filtering reactor 260 are configured so that additive fluxes are produced by a current entering one winding from the energy storage reactor 50 and a current entering the other winding from the input winding 65. It is to be noted that in the embodiment of FIG. 2B the energy storage capacitors 56 and 58 are connected to the positive voltage output 14, rather than the ground voltage output 16 as shown and described for FIG. 1.

Figure 3:
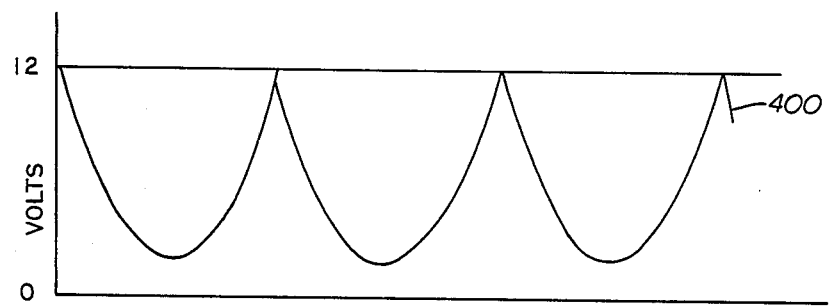
FIG. 3 is a diagram illustrating various waveforms in the circuit of FIGS. 2A and 2B.
Figure 3:
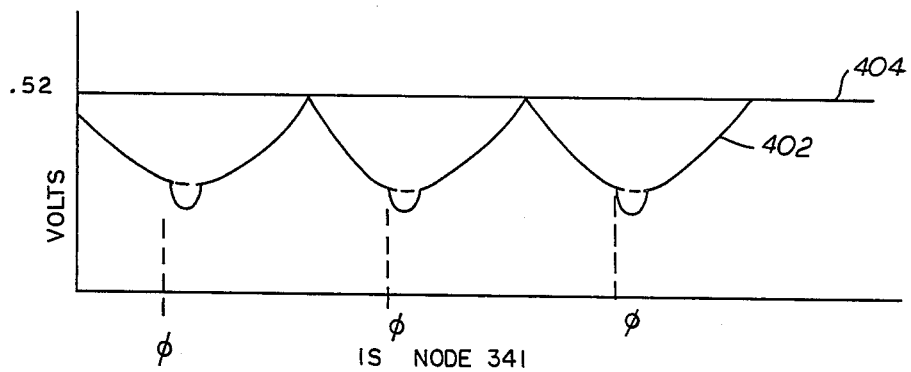

Current limit circuitry 110 is provided (FIG. 2B) as an alternative to protect the switching transistors from overcurrent conditions and the resulting damage. The current sensing resistor 44 is a very low value resistor so that minimal disturbance to the output signal is developed and minimal power is lost. A current sense comparator 332 determines if the switching transistors 202-208 are approaching the current limit point. A reference voltage is supplied to the non-inverting input of comparator 332 by the series combination of three resistors 344, 346 and 348 with resistor 344 being connected to a 12 volt supply and to resistor 346, which in turn is connected to resistor 348 which has its other terminal connected to the ground voltage output 16. In the preferred embodiment this combination produces a reference voltage of approximately 0.52 volts at the non-inverting input of the current sense comparator 332 as shown in waveform 404 (FIG. 3). Therefore, whenever the voltage appearing at the inverting terminal of the current sense comparator 332 exceeds this level, the output of the current sense comparator 332 goes low, indicating an overcurrent condition and the need to limit current.

It is desirable that the current limit be related to the voltage being supplied. It is desirable that this be a direct relationship so that as the supplied voltage increases, the amount of allowable current increases. It is further desirable that at a given phase angle of the alternating current waveform the allowable current further increase, because for an uninterruptible power supply U the most common load is a computer or other electronic system. These devices usually have a power characteristic such that they do not draw current except during limited portions of the complete alternating current waveform. This limited portion is because the computer is classified as a rectification load and rectified loads only conduct during small intervals because they are supplying direct current energy only for small portions of the alternating current waveform.

The desired current limit characteristics are developed in a preferred embodiment by a combination of the current sensing resistor 44, of current control resistors 330, 336, 334 and 340, of a conduction developing diode 338 and the application of a signal referred to as SIN/2 which is developed by the reference waveform circuitry. The signal SIN/2 waveform 400 (FIG. 3) preferably is an inverted waveform such that when the reference waveform is at an effective zero crossing of the reference waveform, the signal SIN/2 level is at a level of approximately 12 volts. As the reference waveform proceeds through its cycle, the signal SIN/2 reduces to a minimum point at which time it returns to its zero level of 12 volts. The cycle is repeated at a rate double the reference waveform frequency because the signal SIN/2 appears as a fully rectified sine wave which travels from a zero condition at 12 volts in a negative direction, preferably to a minimum level of approximately 1.25 volts.

The variable signal developed from the signal SIN/2 is summed with a fixed bias signal which is developed by a series combination of three current control resistors 336, 334 and 330. The first resistor 336 is connected to the 12 volt supply and to second resistor 334, which in turn has its other terminal connected to the third resistor 330, which is connected to the current sense resistor 44. The junction point, or IS node 341, of the second and third resistors 334 and 330 is connected to the inverting input of the current sense comparator 332. The signal SIN/2 is applied to a resistor 340 which has its second terminal connected to the IS node 341. In this way the waveform 402 (FIG. 3) present at the IS node 341 includes a component having a fixed level and a component having a varying level based on output voltage level. Therefore some current is always available from the inverter I during all portions of the output cycle, with greater current being available during other portions of the cycle.

The conduction diode 338 is used to increase the allowed currents at the desired phase angle $\phi$ of the reference waveform (FIG. 3) and has its anode connected to the connection of resistors 336 and 334 and its cathode connected to resistor 340 where the signal SIN/2 is applied. In this way as the signal SIN/2 decreases in value a switchover point develops at which time a portion of the fixed bias level provided through resistor 336 is effectively eliminated. This allows the bias level provided to the current sense comparator 332 at the IS node 341 to be decreased and therefore the effective current limit of the switching transistors increased. This is because the lower the IS node 341 voltage level, the larger the voltage necessary to be developed by the current sense resistor 44 to raise the IS node 341 level to the reference level. Therefore the conduction diode 338 allows additional current to be supplied by the switching transistors at approximately the desired phase angle $\phi$ where a great number of computer system power supplies begin conducting current.

For example, in a preferred embodiment of FIGS. 2A and 2B, the minimum current point is when the reference waveform is at a zero crossing and the IS node 341 level is preferably at approximately 0.48 volts, allowing approximately 1 ampere of current to pass through the switching transistors 202-208. The IS node 341 level is preferably at 0.22 volts when the reference waveform is at a peak, allowing approximately 7 amperes to be conducted by the switching transistors 202-208. Were the conduction diode 338 not present, the IS node 341 level would be at approximately 0.28 volts, allowing approximately 5.7 amperes to be conducted by the switching transistors 202-208. In the preferred embodiment the conduction diode 338 begins to conduct when the IS node 341 voltages reaches approximately 0.29 volts or a current limit of approximately 5.5 amperes. Thus the current limit circuit 110 is adapted to limit short circuits and yet to allow for the varying characteristics of the various types of loads which can be applied to an uninterruptible power supply.

When the reference voltage applied to the non-inverting input of the current sense comparator 332 is greater than the IS node 341 voltage applied to the inverting input, the output of the current sense comparator 332 is open, so that a resistor 350 connected between the 12 volt supply and the output of the current sense comparator 332 pulls up the output voltage and provides a high level signal to one input of a two input shut off AND gate 362, whose output is connected to inputs of the two output control AND gates 106, 108 which are used to drive the switching transistors 202-208. If the voltage on the IS node 341 exceeds the reference voltage, the output of the current sense comparator 332 goes low, causing the shut off AND gate 362 and the output control AND gates 106 and 108 to have low level outputs, deactivating the switching transistors 202-208.

A second comparator 352 is provided in the current limit circuit 110 so that the switching transistors 202-208 are deactivated for at least a minimum time so that a high frequency spike does not affect operation and some current limiting is actually performed. The connection of resistors 346 and 348 provides a reference level of approximately 6 volts to the inverting input of the second comparator 352. The output of the second comparator 352 is connected to the output of the current sense comparator 332 and to one terminal of a resistor-capacitor time constant circuit including a capacitor 360 in series with two resistors 358 and 354. The resistor 354 is connected to the 12 volt supply and has in parallel a diode 356 connected such that the cathode of the diode is connected to the 12 volt supply. The second resistor 358 is connected to the first resistor 354 and to the capacitor 360, which in turn has its other terminal connected to the outputs of the comparators 332 and 352. The inverting input of the second comparator 352 is connected to the junction of the capacitor 360 and the first resistor 358, so that a voltage feedback occurs based on a state of the comparator outputs. A time constant circuit is thus provided so that the second comparator 352 output is at a low level for a given amount of time, preferably 5 microseconds, after the output of the current sense comparator 332 goes low. This delay occurs because under standard operating conditions there is a voltage of zero volts across the capacitor 360. Thus when the voltage output of the current sense comparator 332 goes low, a zero voltage input is presented to the non-inverting input of the second comparator 352. The voltage across capacitor 360 gradually increases until a level of approximately 6 volts is obtained, at which time the output of comparator 352 goes high, indicating that the minimum current time limit has been exceeded. If the output of the current sense comparator 332 is still low, the comparator outputs are still low and the current is limited for a time exceeding the minimum amount.

A shut off AND gate 362 is connected at one input to the output of a two input NOR gate 364. The first input to the NOR gate 364 is a signal labeled SD which is a signal which indicates the battery 22 condition. If the battery voltage is below given, predetermined levels so that power cannot be adequately provided by the power supply U, then the signal SD goes to a high level. This high level at the input of the NOR gate 364 produces a low level at its output and therefore a low level at the output of the shut off AND gate 362, which then causes the switching transistors 202-208 to be deactivated. The signal SD goes low after the batteries 22 have been sufficiently recharged so that reliable operation of the power supply U can occur.

The second input to the NOR gate 364 is connected to an output ON switch 363. When the output ON switch 363 is an open position, the input to the NOR gate 364 is high and the inverter operation I is disabled. Thus the output ON switch 363 is used to shut off the connected device when desired. When the output ON switch 363 is in a closed position, the input to the NOR gate 364 is at a low state and, assuming that the signal SD is also in a low state indicating that the batteries are functional, the output of the NOR gate 364 is high, enabling the operation of the current limit circuit 110 and the feedback amplifier 80.

The output of the NOR gate 364 is coupled back to the IS node 341 to further limit current available during initial powering of the connected device. Connected in series from the output of the NOR gate 364 to the ground voltage output 16 is a capacitor 366 and a resistor 368. A startup current limit diode 370 has its anode connected to the junction of the capacitor 366 and the resistor 368 and its cathode connected to the IS node 341. In this way, when the inverter circuit I activates, the voltage at the IS node 341 is slowly decreased until the voltage appearing across the capacitor 366 is such that normal operation of the current limit circuit 110 occurs. This transitory increase of the IS node 341 voltage is developed so that the initial inrush currents developed by the connected device are limited.

The output voltage appearing at terminals E1 and E2 is fed back to the feedback circuit 80 by means of a feedback resistor 86 which is connected between the E1 terminal and the non-inverting terminal of feedback operational amplifier 82 and a feedback resistor 84 which is connected between the terminal E2 and the inverting terminal of the feedback operational amplifier 82. In the embodiment of FIGS. 2A and 2B the terminals E1 and E2 are the junction of the energy storage reactor 50 with the filtering reactor 260, in contrast to the voltage feedback locations in the FIG. 1 embodiment, which are the junction of the energy storage reactor 50 and the output transformer 60. By means of the feedback arrangement a differencing circuit is developed at feedback operational amplifier 82, so that only the voltage difference appearing across the two terminals is developed, with the common mode signals being rejected. As in the FIG. 1 embodiment, a bias voltage is additionally developed on the non-inverting input of feedback operational amplifier 82 by means of resistor 88 connected to the non-inverting input and to the 12 volt supply. This bias provides a 12 volt level shift to the output of the feedback operational amplifier 82 so that an approximate 12 volt direct current reference level is considered to be the zero level. A feedback or gain resistor 90 is provided from the output of feedback operational amplifier 82 to the inverting input of the feedback operational amplifier 82. The gain is preferably adjusted to divide the received signal to a signal having approximately the same peak to peak magnitude as the reference signal waveform, so that in the preferred embodiment the feedback operational amplifier 82 produces a signal having an instantaneous level from approximately 2 to 22 volts. The signals E1 and E2 are such that they are 180 degrees out of phase with respect to the waveform provided by the voltage reference 92 and its output signal REF. The signal REF preferably has a bias of approximately 11.75 volts and a 20 volt peak to peak swing. Therefore when the reference signal REF and the output of the feedback operational amplifier 82 are connected at the voltage difference point 94 by the connection of the resistors 98 and 96, the resulting voltage is an error voltage indicative of the magnitude and direction of the error between the output waveform and the reference waveform. Because in the preferred embodiment the resistors 96 and 98 are equal in resistance, the resulting zero error level voltage is approximately 11.875 volts.

This error voltage is applied to the inputs of two comparators 300, 302 which are used to determine if the error voltage is of sufficient magnitude that activation of the switching transistors is necessary. An approximate 12 volt reference level is developed at the non-inverting input of the first comparator 300 by means of resistor 304, which is connected between the non-inverting input and the 12 volt supply. The output of the first comparator 300 is pulled up to the 12 volt supply by a pull up resistor 306 and the output voltage is fed back to the non-inverting input by a feedback resistor 308 so that some hysteresis is developed in the first comparator 300 to help prevent oscillation. Therefore the reference level for comparator 300 is set at approximately 12 volts, with a hysteresis level of approximately 0.07 volts to 11.93 volts, approximately 1.5% of the divided peak output voltage above the zero error level. When the first comparator 300 determines that the error signal is greater than the reference level present at the non-inverting terminal, the output of the first comparator 300 goes low. The output of the first comparator 300 is inverted by a NOR gate 312, whose output is in turn connected to one input of one output control AND gate 106.

In contrast, the reference level of the second comparator 302 is determined by the combination of resistors 314 and 316 which are connected in series from 12 volt supply to the ground voltage output 16, with the junction point being applied to the non-inverting input of the second comparator 302. A pull-up resistor 318 is provided from the output of the second comparator 302 to the 12 volt supply and a feedback resistor 320 is provided from the output to the non-inverting input of the second comparator 302 for hysteresis. Therefore, whenever the error voltage is greater than a given amount below the desired reference level, preferably at 11.78 volts with a hysteresis level of approximately 0.07 volts to 11.85 volts, the second comparator 302 allows its output to go to a high state, thus causing one input to the second output control AND gate 108 to go high. Whenever the reference level is above a given point below the desired activation level, the output of the second comparator 302 is driven low and the output of the second output control AND gate 108 is a low level signal to disable the switching transistor.

The outputs of the output control AND gates 106 and 108 are connected to two buffer drivers 324 and 326, respectively, which are actually used to drive the switching transistors 202–208. The buffer drivers 324, 326 are devices which are better suited to drive the switching transistors than the output control AND gates 106 and 108. For example, buffer driver 324 is connected to the switching transistor 204 by means of a resistor 380 connected between the output of the buffer driver 324 and the gate of the switching transistor 204, with a zener diode 382 connected so that its cathode is connected to the gate of transistor 204 and its anode is connected to the current limit resistor 44. A similar network utilizing resistor 388 and diode 390 is provided from buffer driver 324 to switching transistor 202. Similar networks are connected to buffer driver 326 and switching transistors 206 and 208. These networks are provided to provide separation and proper drive signals to the two switching transistors driven by a single buffer driver.

Therefore it can be seen that in operation this inverter I has self-setting duty cycle of operation based on the load and the reference signal. As the load deviates from the desired reference waveform, the switching transistors are activated to drive the load to the desired direction as needed. Should the output voltage then overshoot the desired limits, the alternate switching transistor is activated to drive the output voltage back t the desired levels. It is also noted that the switching transistors are referenced to the ground voltage output to allow easy design of the inverter control circuitry.

The foregoing disclosure and description of the invention are illustrative and explanatory thereof, and various changes in the size, shape, materials, components, circuit elements, wiring connections and contacts, as well as in the details of the illustrated circuitry and construction may be made without departing from the spirit of the invention.

I claim:

1. An inverter for providing an alternating current voltage from a direct current voltage source, comprising:
    a direct current voltage source having positive and ground voltage outputs;
    an output transformer having an input winding having two input terminals and a center tap and having an output winding for providing the alternating current voltage, said center tap being coupled to the positive voltage output of said direct current voltage source;

energy storage means coupled to both of said input terminals of said output transformer and to said direct current voltage source and having two energy control terminals;

two electronic switching means, each switching means coupled to a separate one of said energy control terminals of said energy storage means and to the ground voltage output of said direct current voltage source and having a control input to control activation of said switching means to couple said energy storage means to said ground voltage output of said direct current voltage source, said control input being referenced to the ground voltage output of said direct current voltage source;

reference source means for providing a single reference waveform indicative of the frequency and voltage desired for the output alternating current voltage;

first comparator means for comparing the voltage across the input terminals of said output transformer for activating one of said electronic switching means when said voltage is more than an approximate predetermined amount greater than said reference source voltage and for inactivating said one electronic switching means when said voltage is less than said approximate predetermined amount greater than said reference source voltage; and second comparator means for comparing the voltage across the input terminals of said output transformer for activating the other of said electronic switching means when said voltage is more than an approximate predetermined amount less than said reference source voltage and for inactivating the other of said electronic switching means when said voltage is less than said approximate predetermined amount less than said reference source voltage.

2. The inverter of claim 1, further comprising:
current limit means coupled to said direct current voltage source and to said electronic switching means for limiting the magnitude of the instantaneous current flowing from said energy storage means to said direct current voltage source.

3. The inverter of claim 2, wherein said current limit means includes a resistor connecting each of said electronic switching means to said direct current voltage source ground voltage output.

4. The inverter of claim 2, wherein said current limit means includes means for inactivating each of said electronic switching means when instantaneous currents greater than a predetermined magnitude are flowing from said energy storage means to said direct current voltage source.

5. The inverter of claim 2, wherein said current limit means includes means for varying the magnitude at which the instantaneous current is limited.

6. The inverter of claim 5, wherein said magnitude varying means limits the instantaneous current at a lower magnitude when said reference source voltage is near the zero alternating current voltage level.

7. The inverter of claim 5, wherein said magnitude varying means limits the instantaneous current to a predetermined level, which level is increased according to the magnitude of the reference waveform during portions of the reference waveform.

8. The inverter of claim 7, wherein said magnitude varying means limits the instantaneous current to a predetermined level, which level is changed at a rate greater than the rate of change of the reference waveform during portions of the reference waveform.

9. The inverter of claim 1, wherein said reference source means provides a sinusoidal reference waveform.

10. The inverter of claim 1, wherein said energy storage means includes a dual winding energy storage reactor and two energy storage capacitors, with each winding of said energy storage reactor having two terminals, with one terminal being the energy control terminal and the other terminal coupled to one of said output transformer input terminals, said energy storage reactor windings configured so that additive fluxes are produced by currents entering the energy control terminal of one winding and the output transformer coupled terminal of the second winding, and with each said energy storage capacitor having two terminals, with one terminal coupled to one of said output transformer input terminals and the other terminal connected to said direct current voltage source.

11. The inverter of claim 10, wherein said other terminal of each said energy storage capacitor is connected to the positive voltage output of said direct current voltage source.

12. The inverter of claim 10, wherein said other terminal of each said energy storage capacitor is connected to the ground voltage output of said direct current voltage source.

13. The inverter of claim 10, wherein said energy storage means further includes a dual winding filtering reactor, two filtering capacitors and two filtering resistors, with each said filtering reactor winding, filtering capacitor and filtering resistor having two terminals, with one of each said filtering reactor winding terminals connected to said energy storage reactor output transformer coupled terminal and to said energy storage capacitor output transformer coupled terminal and the other said filtering reactor winding terminal connected to one of said output transformer input terminals, said filtering reactor windings configured so that additive fluxes are produced by currents entering the output transformer connected terminal of one winding and the energy storage reactor connected terminal of the other winding, with said filtering resistor connected in parallel with each said filtering reactor winding, and with one terminal of each said filtering capacitor connected to said direct current voltage source and the other said terminal of each said filtering capacitor connected to an output transformer input terminal.

14. The inverter of claim 1, wherein each of said electronic switching means includes a transistor having a terminal coupled to said direct current voltage source ground voltage output, a terminal coupled to said energy storage means energy control terminal, and a terminal for control.

15. The inverter of claim 14, wherein each of said electronic switching means further includes a limiting inductor, a limiting diode and a limiting resistor, each having two terminals,
   with one terminal of said limiting inductor and one terminal of said limiting resistor connected to an energy storage means energy control terminal,
   with the cathode of said limiting diode connected to the other terminal of said resistor, and
   with the anode of said limiting diode and the other terminal of said limiting inductor connected to said transistor terminal coupled to said energy storage means control terminal.

16. The inverter of claim 1, further comprising:
overvoltage clamp means coupled to said terminals of each of said electronic switching means coupled to said energy storage means energy control terminals and coupled to the direct current voltage source to prevent voltages greater than a predetermined amount from appearing in said electronic switching means.

17. An uninterruptible power supply for providing an alternating current voltage when an alternating current voltage source is supplied and for a period when the alternating current voltage source is removed, comprising:
   rectification means for coupling to the alternating current voltage source for providing a direct current voltage source having positive and ground voltage outputs while the alternating current voltage source is supplied;
   a battery for providing energy when the alternating current voltage source is removed, the negative terminal of said battery being connected to said rectification means ground voltage output;
   battery charger means for coupling to said alternating current voltage source and coupled to said battery for charging said battery while the alternating current voltage source is supplied;
   boost convertor means coupled to the positive terminal of said battery and to said rectification means positive voltage output for providing a direct current voltage having approximately the same value as said rectification means from said battery when the alternating current voltage source is removed;
   an output transformer having an input winding having two input terminals and a center tap and having an output winding for providing the alternating current voltage, said center tap being coupled to said rectification means positive voltage output;
   energy storage means coupled to both of said input terminals of said output transformer and to said rectification means and having two energy control terminals;
   two electronic switching means, each switching means coupled to a separate one of said energy control terminal of said energy storage means and to said rectification means ground voltage output and having a control input to control activation of said switching means to couple said energy storage means to said rectification means ground voltage output, said control input being referenced to said rectification means ground voltage output;
   reference source means for providing a single reference waveform indicative of the frequency and voltage desired for the output alternating current voltage;
   first comparator means for comparing the voltage across the input terminals of said output transformer for activating one of said electronic switching means when said voltage is more than an approximate predetermined amount greater than said reference source voltage and for inactivating said one electronic switching means when said voltage is less than said approximate predetermined amount greater than said reference source voltage; and
   second comparator means for comparing the voltage across the input terminals of said output transformer for activating the other of said electronic switching means when said voltage is more than an approximate predetermined amount less than said reference source voltage and for inactivating the other of said electronic switching means when said voltage is less than said approximate predetermined amount less than said reference source voltage.

18. The uninterruptible power supply of claim 17, further comprising:
current limit means coupled to said direct current voltage source and to said electronic switching means for limiting the magnitude of the instantaneous current flowing from said energy storage means to said rectification means.

19. The uninterruptible power supply of claim 18, wherein said current limit means includes a resistor connecting each of said electronic switching means to said rectification means ground voltage output.

20. The uninterruptible power supply of claim 18, wherein said current limit means includes means for inactivating each of said electronic switching means when instantaneous currents greater than a predetermined magnitude are flowing from said energy storage means to said direct current voltage source.

21. The uninterruptible power supply of claim 18, wherein said current limit means includes means for varying the magnitude at which the instantaneous current is limited.

22. The uninterruptible power supply of claim 21, wherein said magnitude varying means limits the instantaneous current at a lower magnitude when said reference source voltage is near the zero alternating current voltage level.

23. The uninterruptible power supply of claim 21, wherein said magnitude varying means limits the instantaneous current to a predetermined level, which level is increased according to the magnitude of the reference waveform during portions of the reference waveform.

24. The uninterruptible power supply of claim 23, wherein said magnitude varying means limits the instantaneous current to a predetermined level, which level is changed at a rate greater than the rate of change of the reference waveform during portions of the reference waveform.

25. The uninterruptible power supply of claim 17, wherein said reference source means provides a sinusoidal reference waveform.

26. The uninterruptible power supply of claim 17, wherein said energy storage means includes a dual winding energy storage reactor and two energy storage capacitors,
   with each winding of said energy storage reactor having two terminals, with one terminal being the energy control terminal and the other terminal coupled to one of said output transformer input terminals, said energy storage reactor windings configured so that additive fluxes are produced by currents entering the energy control terminal of one winding and the output transformer coupled terminal of the second winding, and with each said energy storage capacitor having two terminals, with one terminal coupled to one of said output transformer input terminals and the other terminal being connected to said rectification means.

27. The uninterruptible power supply of of claim 26, wherein said other terminal of each said energy storage capacitor is connected to rectification means positive voltage output.

28. The uninterruptible power supply of claim 26, wherein said other terminal of each said energy storage capacitor is connected to said rectification means ground voltage output.

29. The uninterruptibe power supply of claim 26, wherein said energy storage means further includes a dual winding filtering reactor, two filtering capacitors and two filtering resistors, with each said filtering reactor winding, filtering capacitor and filtering resistor having two terminals, with one of each said filtering reactor winding terminals connected to said energy storage reactor output transformer coupled terminal and to said energy storage capacitor output transformer coupled terminal and the other said filtering reactor winding terminal connected to one of said output transformer input terminals, said filtering reactor windings configured so that additive fluxes are produced by currents entering the output transformer connected terminal of one winding and the energy storage reactor connected terminal of the other winding, with said filtering resistor connected in parallel with each said filtering reactor winding, and with one terminal of each said filtering capacitor connected to said direct current voltage source and the other said terminal of each said filtering capacitor connected to an output transformer input terminal.

30. The uninterruptible power supply of claim 17, wherein each of said electronic switching means includes a transistor having a terminal coupled to said rectification means ground voltage output, a terminal coupled to said energy storage means energy control terminal, and a terminal for control.

31. The uninterruptible power supply of claim 30, wherein each of said electronic switching means further includes a limiting inductor, a limiting diode and a limiting resistor, each having two terminals, with one terminal of said limiting inductor and one terminal of said limiting resistor connected to an energy storage means energy control terminal, with the cathode of said limiting diode connected to the other terminal of said resistor, and with the anode of said limiting diode and the other terminal of said limiting inductor connected to said transistor terminal coupled to said energy storage means control terminal.

32. The uninterruptible power supply of claim 17, further comprising:

overvoltage clamp means coupled to said terminals of each of said electronic switching means coupled to said energy storage means energy control terminals and coupled to the rectification means to prevent voltages greater than a predetermined amount from appearing in said electronic switching means.

* * * * *